(12) United States Patent
Jang et al.

(10) Patent No.: US 7,732,515 B2
(45) Date of Patent: Jun. 8, 2010

(54) SCRATCH-RESISTANT FLAMEPROOF THERMOPLASTIC RESIN COMPOSITION

(75) Inventors: Bok Nam Jang, Anyang-si (KR); In Chul Jung, Seoul (KR); Jung Hwan Yun, Gunpo-si (KR); Jin Hwan Choi, Anyang-si (KR)

(73) Assignee: Cheil Industries Inc., Gumi-si (KR)

( * ) Notice: Subject to any disclaimer, the term of this patent is extended or adjusted under 35 U.S.C. 154(b) by 42 days.

(21) Appl. No.: 12/250,648

(22) Filed: Oct. 14, 2008

(65) Prior Publication Data

US 2009/0118402 A1 May 7, 2009

Related U.S. Application Data

(63) Continuation-in-part of application No. PCT/KR2006/005898, filed on Dec. 29, 2006.

(30) Foreign Application Priority Data

Apr. 14, 2006 (KR) .................. 10-2006-0034253
Dec. 26, 2006 (KR) .................. 10-2006-0133779

(51) Int. Cl.
*C08K 5/523* (2006.01)
(52) U.S. Cl. .................. 524/127; 524/140; 524/141
(58) Field of Classification Search .................. 524/127, 524/140, 141
See application file for complete search history.

(56) References Cited

U.S. PATENT DOCUMENTS

| 5,061,745 A | 10/1991 | Wittmann et al. |
| 5,204,394 A | 4/1993 | Gosens et al. |
| 5,292,786 A | 3/1994 | Gaggar et al. |
| 5,674,924 A | 10/1997 | Lee et al. |
| 6,423,767 B1 | 7/2002 | Weber et al. |

FOREIGN PATENT DOCUMENTS

| JP | 2001-234040 A | 8/2001 |
| KR | 2003-0000415 A | 1/2003 |

OTHER PUBLICATIONS

Krevelen, "Some basic aspects of flame resistance of polymeric materials," Polymer, Elsevier Science, Ltd., vol. 16, pp. 615-620 (1975).
Stoliarov et al., "A reactive molecular dynamics model of thermal decomposition in polymers: I Poly(methyl methacrylate)," Polymer, Elsevier Science, Ltd., vol. 44, pp. 883-894 (2003).
International Search Report for corresponding International Application No. PCT/KR2006/005898, mailed on Apr. 12, 2007.

*Primary Examiner*—Peter Szekely
(74) *Attorney, Agent, or Firm*—Summa, Additon & Ashe, P.A.

(57) ABSTRACT

Disclosed herein is a flame retardant thermoplastic resin composition that has superior scratch resistance and mechanical properties, satisfying requirements for the appearance of housing materials resulting from a recent increase in volume of electrical and electronic products, and that contains a phosphorus-based flame-retarding agent, satisfying requirements for fire safety and prevention of environmental problems. The resin composition with scratch resistance comprises a base resin comprising (A) about 30 to about 90 parts by weight of a polycarbonate resin, (B) about 15 to about 50 parts by weight of a polymethylmethacrylate resin and (C) about 5 to about 50 parts by weight of a polyethylene terephthalate-based resin, and (D) about 5 to about 30 parts by weight of a phosphorus-based flame-retarding agent based on 100 parts by weight of the base resin. The composition may further comprise about 1 to about 30 parts by weight of an impact modifier based on 100 parts by weight of the base resin.

8 Claims, No Drawings

SCRATCH-RESISTANT FLAMEPROOF THERMOPLASTIC RESIN COMPOSITION

CROSS-REFERENCE TO RELATED APPLICATIONS

This non-provisional application is a continuation-in-part application of PCT Application No. PCT/KR2006/005898, filed Dec. 29, 2006, pending, which designates the U.S. and which is hereby incorporated by reference in its entirety, and claims priority therefrom under 35 USC Section 120. This application also claims priority under 35 USC Section 119 from Korean Patent Application No. 10-2006-0034253, filed Apr. 14, 2006, and Korean Patent Application No. 10-2006-0133779, filed Dec. 26, 2006, the entire disclosure of each of which is also hereby incorporated by reference.

FIELD OF THE INVENTION

The present invention relates to thermoplastic resin compositions with superior scratch resistance, non-halogen flame retardancy, and processiblity.

BACKGROUND OF THE INVENTION

Polycarbonate (PC) resins are polymer resins that have superior mechanical strength, transparency, thermal stability, self-extinguishing properties, dimensional stability, and the like, and that have many uses for electrical and electronic products, vehicle components, and the like.

Because polycarbonate resins have a polymer structure that can facilitate flame retardancy, polycarbonate resins can be used as typical flame-retarding agents and easily achieve flame retardancy.

In particular, because PC resins can form char, a PC resin combined with a phosphorus-based flame-retarding agent can easily achieve flame retardancy without environmental problems. Moreover, as disclosed in U.S. Pat. No. 5,061,745, U.S. Pat. No. 5,204,394, and U.S. Pat. No. 5,674,924, compositions formed by melting and blending PC and a rubber-modified styrene-based resin (ABS resin) can further improve processiblity.

However, although PC resins and PC/ABS resins have merits in terms of high processiblity and superior impact resistance, both PC resins and PC/ABS resins have weak scratch resistance, so that products made of such PC resins or PC/ABS resins have low scratch resistance.

Polymethylmethacrylate (PMMA) resins not only have excellent scratch resistance and weather resistance, but also superior surface-glossing, bonding properties, and mechanical properties, such as tensile strength, elastic modulus, etc. PMMA resins are widely used in ornamental articles, signboards, illuminating materials, various kinds of construction materials, bonding agents, modifiers of other plastic materials, and the like.

However, PMMA resins have a lower impact resistance, compared with that of other plastic materials, and are likely to be fractured by an external impact. Moreover, because PMMA exhibits a limiting oxygen index of 17 required for continuous burning and does not form char upon combustion, it is difficult to impart flame retardancy to PMMA.

This difficulty is closely related to the easy formation of monomers as by-products of thermal decomposition, during which PMMA is sequentially subjected to chain scission followed by β-scission, as set forth in Polymer (published by Elsevier Science, LTD., Volume 44, pp. 883-894, 2003).

Therefore, when producing a flame retardant resin by blending only PC resin and PMMA resin, a large amount of a flame-retarding agent must be used due to the low flame retardancy of PMMA. If the amount of PMMA resin is reduced to ensure flame retardancy, however, it is difficult to attain superior scratch resistance.

U.S. Pat. No. 5,292,786 discloses a composition with superior weld line strength, which is formed by adding phosphoric ester as a flame-retarding agent and PMMA to PC and ABS resins. However, because the composition of the disclosure has a relatively small amount of PMMA to impart scratch resistance, and the PC and ABS resins in the composition have low scratch resistance, the composition may not have adequate scratch resistance.

Polyethylene terephthalate (PET) resins have excellent wear resistance as well as good mechanical properties and superior chemical resistance and thus can be advantageous for improving scratch resistance.

However, PET-based resins have the disadvantages of reduced flame retardancy and low notched-impact resistance.

Currently, as the appearance of housing materials becomes more and more important as the size of electrical and electronic products increases, resins are required to have scratch resistance. In addition, the use of flame retardant resins is emphasized to ensure fire safety. Furthermore, to address environmental concerns, there is an increasing interest in eliminating halogen containing substances from the resins. It is very difficult, however, to produce a resin that can meet all the requirements as described above using conventional techniques.

Therefore, there is still a need to develop a thermoplastic resin composition that can satisfy all requirements for superior scratch resistance, fire safety, and prevention of environmental problems while maintaining its mechanical properties.

BRIEF SUMMARY OF THE INVENTION

The present invention provides a thermoplastic resin composition having excellent mechanical properties, scratch resistance, and halogen free flame retardancy obtained by adding a phosphorus-based flame-retarding agent and, optionally, an impact modifier into a base resin formed by combining a polycarbonate resin, a polymethylmethacrylate resin, and a polyethylene terephthalate-based resin in a suitable ratio.

In exemplary embodiments of the invention, the flame retardant thermoplastic resin composition with superior scratch resistance comprises: a base resin comprising (A) about 30 to about 90 parts by weight of a polycarbonate resin, (B) about 15 to about 50 parts by weight of a polymethylmethacrylate resin, and (C) about 5 to about 50 parts by weight of a polyethylene terephthalate-based resin; and (D) about 5 to about 30 parts by weight of a phosphorus-based flame-retarding agent based on 100 parts by weight of the base resin.

According to the present invention, the flame retardant thermoplastic resin composition has superior scratch resistance along with good mechanical properties, satisfying the requirement for the appearance of housing materials resulting from the recent increase in the volume of electrical and electronic products. Furthermore, the thermoplastic resin composition contains a phosphorus-based flame-retarding agent, satisfying the requirements for fire safety and prevention of environmental problems. Therefore, the thermoplastic resin composition of the invention can be useful in the manufacture of various molded articles for electrical and electronic precision components and the like.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

According to the present invention, a flame retardant thermoplastic resin composition with superior scratch resistance comprises: a base resin comprising (A) about 30 to about 90 parts by weight of a polycarbonate resin, (B) about 15 to about 50 parts by weight of a polymethylmethacrylate resin, and (C) about 5 to about 50 parts by weight of a polyethylene terephthalate-based resin; and (D) about 5 to about 30 parts by weight of a phosphorus-based flame-retarding agent based on 100 parts by weight of the base resin.

The polyethylene terephthalate-based resin (C) can be an amorphous polyethylene terephthalate resin.

The thermoplastic resin composition can optionally further comprise about 1 to about 30 parts by weight of an impact modifier based on 100 parts by weight of the base resin.

The thermoplastic resin composition may further comprise at least one additive selected from the group consisting of anti-dripping agents, oxidation inhibitors, plasticizers, heat stabilizers, light stabilizers, compatibilizers, pigments, dyes, inorganic fillers, and the like, and combinations thereof.

Components of the resin composition will be described in detail hereafter.

(A) Polycarbonate (PC) Resin

Aromatic polycarbonate resins (A) in accordance with the invention can be obtained by reaction of diphenol with phosgene, haloformate or diester carbonate, wherein the diphenol is represented by the following Formula 1.

Formula 1:

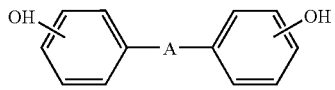

wherein A is a single bond, $C_1$-$C_5$ alkylene, $C_1$-$C_5$ alkylindene, $C_5$-$C_6$ cycloalkylidene, —S—, —$SO_2$—, or —$SiO_2$—.

Examples of diphenols represented by Formula 1 can include without limitation hydroquinol, resorcinol, 4,4'-dihydroxydiphenyl, 2,2-bis-(4-hydroxyphenyl)-propane (commonly called bisphenol-A or BPA), 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane, and the like, and combinations thereof.

The polycarbonate resin of the invention can have a weight average molecular weight ($M_w$) of about 10,000 to about 200,000 g/mol, for example, about 15,000 to about 80,000 g/mol.

The polycarbonate resin may comprise a branched chain. The polycarbonate resin may be obtained by adding about 0.05 to about 2 mol % of a multi-functional compound having a valence of 3 or more, for example, a compound containing a phenol group having a valence of 3 or more, to the rest of diphenol used for polymerization.

In accordance with the invention, the amount of polycarbonate resin (A) is in the range of about 30 to about 90 parts by weight, for example about 50 to about 70 parts by weight, based on the weight of the base resin which comprises (A) the polycarbonate resin, (B) the polymethylmethacrylate resin, and (C) the polyethylene terephthalate-based resin.

Because the polycarbonate resin facilitates flame retardancy, an amount of polycarbonate resin less than about 30 parts by weight can reduce flame retardancy and mechanical strength of the resin composition. An amount of polycarbonate resin more than about 90 parts by weight can reduce scratch resistance of the resin composition. Polycarbonate resin in an amount of about 50 to about 70 parts by weight can be useful in exemplary embodiments to maintain a balance of physical properties.

(B) Polymethylmethacrylate (PMMA) Resin

PMMA resins in accordance with the invention comprise a homopolymer containing methylmethacrylate as a main component, a copolymer containing at least one group selected from alkyl acrylate groups and alkyl methacrylate groups, or a mixture thereof.

The amount of PMMA resin can range from about 15 to about 50 parts by weight, for example about 20 to about 40 parts by weight, based on the weight of the base resin which comprises (A) the polycarbonate resin, (B) the polymethylmethacrylate resin, and (C) the polyethylene terephthalate-based resin. An amount of PMMA resin less than about 15 parts by weight can make it difficult to impart scratch resistance and an amount of PMMA resin more than about 50 parts by weight can reduce flame retardancy.

In particular, the PMMA resin can make it difficult to attain flame retardancy with a phosphorus-based flame-retarding agent.

PMMA resin in an amount of about 20 to about 40 parts by weight can be useful in exemplary embodiments to attain both scratch resistance and flame retardancy at the same time.

(C) Polyethylene Terephthalate (PET) Based Resin

PET-based resins in accordance with the invention serve not only to improve wear resistance, but also to improve the flame retardancy of the whole resin composition via a correlated reaction with the polycarbonate and polymethylmethacrylate resins upon burning of the composition.

The amount of polyethylene terephthalate-based resin can range from about 5 to about 50 parts by weight, for example about 5 to about 25 parts by weight, based on the total weight of the base resin. An amount of polyethylene terephthalate-based resin less than about 5 parts by weight can have an insignificant effect on enhancing wear resistance and flame retardancy, and an amount of polyethylene terephthalate-based resin more than about 50 parts by weight can reduce notched-impact strength.

Polyethylene terephthalate-based resin in an amount of about 5 to about 25 parts by weight can be useful in exemplary embodiments to maintain the balance of physical properties.

Examples of polyethylene terephthalate-based resins may include, but are not limited to, conventional polyethylene terephthalate resins (PET), polyethylene terephthalate resins obtained by recycling, and the like, as well as combinations thereof.

In exemplary embodiments of the invention, the polyethylene terephthalate-based resin may be amorphous polyethylene terephthalate or glycol-modified polyethylene terephthalate, such as poly(ethylene-1,4-cyclohexanedimethylene terephthalate) (PETG), and the like, and combinations thereof, to improve notched-impact resistance.

If necessary, a portion or all of the polyethylene terephthalate resin may be substituted by poly(butylene terephthalate) (PBT), poly(cyclohexane terephthalate) (PCT), poly(ethylene naphthalate) (PEN), and the like, as well as combinations thereof.

In exemplary embodiments, the composition of the invention essentially consists of the PC, PMMA, and PET resins as the base resin.

For example, if PET is not present in the composition, desired scratch resistance of the composition can be obtained by increasing the content of PMMA, but the flame retardancy is reduced due to the decomposition properties of PMMA.

In accordance with the invention, PET in the composition changes the decomposition path of PMMA when the composition is burned to relatively easily obtain flame retardancy and produce a flame retardant resin with a conventional halogen free based flame retarding agent. Furthermore, an impact modifier is optionally added to the resin composition so that the resin composition has improved impact strength and can be useful in any of the desired applications.

(D) Phosphorus-Based Flame-Retarding Agent

The flame-retarding agent in accordance with the invention is typically a phosphorus-based flame-retarding agent, such as but not limited to an aromatic phosphoric ester-based compound.

The aromatic phosphoric ester-based compound has a structure of the following Formula 2, but it should be understood that the scope of the invention is not limited to the aromatic phosphoric ester-based compound of Formula 2.

Formula 2:

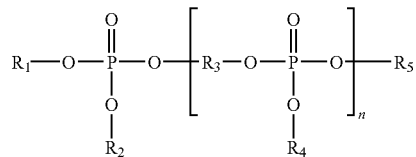

wherein $R_1$, $R_2$, $R_4$, and $R_5$ are each independently a $C_6$-$C_{20}$ aryl group or a $C_1$-$C_{20}$ alkyl-substituted $C_6$-$C_{20}$ aryl group, $R_3$ is derived from a dialcohol, such as resorcinol, hydroquinol, bisphenol-A, bisphenol-S, and the like, and the value of n is in the range of 0 to 5.

When n is 0, the phosphoric ester-based compound may include triphenylphosphate, tricresylphosphate, cresyldiphenylphosphate, trixylenylphosphate, tri(2,4,6-trimethylphenyl)phosphate, tri(2,4-ditertiarybutylphenyl)phosphate, tri(2,6-ditertiarybutylphenyl)phosphate, and the like, and combinations thereof.

When n is 1, the phosphoric ester compound may include resorcinol bis(diphenylphosphate), hydroquinol bis(diphenylphosphate), bisphenol-A-bis(diphenylphosphate), resorcinol bis(2,6-ditertiarybutylphenylphosphate), hydroquinol bis(2,6-dimethylphenylphosphate), and the like, and combinations thereof.

When n is 2 or more, the phosphoric ester-based compound may exist as a mixture in the form of oligomer.

The aforementioned compounds may be added to the base resin as a single or blended compound.

The aromatic phosphoric ester-based compound may be partially or entirely substituted by any of other phosphorus containing compounds of different structures, such as red phosphorus, phosphonate, phosphinate, phosphagen, and the like, and combinations thereof.

The aromatic phosphoric ester-based compound is added to the produced resin composition in accordance with the invention as a flame-retarding agent, and the amount may be in the range of about 5 to about 30 parts by weight based on 100 parts by weight of the base resin.

An amount of the aromatic phosphoric ester-based compound less than about 5 parts by weight can make it difficult to attain the desired flame retardancy, and an amount of the aromatic phosphoric ester-based compound more than about 30 parts by weight can reduce mechanical strength and thermal resistance.

(E) Impact Modifier

An impact modifier in accordance with the invention may be added to the resin composition to enhance impact resistance. The impact modifier can include graft copolymers, olefin-based copolymers, and combinations thereof.

The graft copolymers are obtained by polymerizing at least one rubber monomer selected from the group consisting of diene-based rubbers, acrylate-based rubbers, and silicone-based rubbers to form a rubber polymer, followed by grafting at least one monomer selected from the group consisting of graft-copolymerizable styrene, alpha-methyl styrene, alkyl-substituted styrene, acrylonitrile, methacrylonitrile, methylmethacrylate, maleic anhydride, alkyl or phenyl nucleus-substituted maleimide, and the like to the rubber polymer. The impact modifier can include the rubber in an amount of about 20 to about 80 parts by weight.

Exemplary diene-based rubbers include without limitation butadiene, isoprene, and the like, and combinations thereof.

Examples of the acrylate-based rubbers may include monomers, such as methylacrylate, ethylacrylate, n-propylacrylate, n-butylacrylate, 2-ethylhexylacrylate, hexylmethylacrylate, 2-ethylhexylmethylacrylate, and the like, and combinations thereof.

The silicone-based rubbers may be made of cyclosiloxanes, for example, hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, octaphenylcyclotetrasiloxane, and the like, and combinations thereof. At least one of these cyclosiloxanes may be selected and used as the silicone-based rubber.

Additionally, it is possible to use ethylene/propylene rubbers, or polyolefin-based rubbers such as terpolymer of ethylene-propylene-diene (EPDM), and the like, as well as combinations thereof.

In accordance with the invention, although the impact modifier may be optionally added depending on the use of the resin composition, the amount of impact modifier can be present in the range of about 1 to about 30 parts by weight, based on 100 parts by weight of the base resin which comprises the aforementioned (A), (B) and (C) resins.

In a method for manufacturing the thermoplastic resin composition of the present invention, at least one additive selected from the group consisting of anti-dripping agents such as polytetrafluoroethylene, oxidation inhibitors, plasticizers, heat stabilizers, light stabilizers, compatibilizers, pigments, dyes, inorganic fillers, and the like, as well as combinations thereof may be added to the resin composition depending on the respective application of the resin composition.

Examples of the inorganic fillers may include glass fiber, clay, silica, talc, ceramics, and the like, and combinations thereof. Such additives can be present in the resin composition in an amount up to about 50 parts by weight, based on 100 parts by weight of the base resin.

The resin composition may be produced using any of the known methods that can be used to produce resin compositions. For example, the resin composition may be prepared in the form of pellets by simultaneously blending the components of the composition of the present invention and other additives, followed by melt-extrusion using an extruder.

The resin composition of the invention may be used in molding various products and is particularly useful in the production of components for electrical and electronic products, such as housings for TVs and office automation equipment.

Hereinafter, the present invention will be described in more detail with reference to the following examples. These examples are proposed to illustrate the present invention more specifically, and it will be apparent to those skilled in the art that the scope of the present invention is not limited to these examples.

EXAMPLES

Components of a base resin, a flame-retarding agent, and an impact modifier used for inventive examples and comparative examples are as follows.

(A) Polycarbonate Resin (PC)

Panlite L-1225 Grade available from Teijin Chemicals Ltd. of Japan is used as the PC resin.

(B) Polymethylmethacrylate Resin (PMMA)

PMMA IH 830 Grade available from LG Chemical Ltd. of South Korea is used as the PMMA resin.

(C) Polyethylene Terephthalate-Based Resin (PETG)

SKY Green K2012 Grade, which is a glycol-modified amorphous PET resin available from SK Chemical Co. of South Korea, is used as the PETG resin.

(D) Aromatic Phosphoric Ester-Based Compound (PX-200)

PX-200 Grade, which is resorcinol bis(di-2,6-xylenylphosphate) available from Daihachi Chemical Industry Co., Ltd. of Japan, is used as the phosphoric ester-based compound in the inventive example and comparative examples.

(E) Impact Modifier (MBS: Methylmethacrylate-Butadiene-Styrene)

Metablen C223-A Grade, which is available from MRC Corporation and obtained by graft copolymerization of methylmethacrylate and styrene to a butadiene rubber, is used as the impact modifier.

(F) Anti-Dripping Agent (Polytetrafluoroethylene: PTFE)

Teflon™7AJ available from Dupont Co. of U.S.A. is used as the anti-dripping agent.

Inventive Examples 1-4 and Comparative Examples 1-7

Resin compounds are produced in pellet shapes by blending materials (A)-(D) as described above in amounts listed in Table 1, followed by extruding the blended materials at temperatures in the range of 220-260° C. through a typical twin-screw extruder.

Pellets of each resin compound are dried at 80° C. for 3 hours, followed by injection-molding at a injection temperature of 250° C. and a mold temperature of 60° C. with 8 Oz injection molding machine, thereby providing test specimens used for measuring impact resistance, flame retardancy, and pencil hardness.

For the test specimens of the invention and comparative examples prepared as shown in the following Table 1, the flame retardancy is evaluated according to a flame retardancy regulation in UL 94V, and Izod impact strength is evaluated according to ASTM D-256. The pencil hardness is evaluated using specimens of 10 cm by 10 cm which are maintained at a temperature of 23° C. and a relative humidity of 50% for 48 hours according to JIS K 5401.

Scratch resistance is classified as 3B, 2B, B, HB, F, H, 2H, 3H, etc. based on the results of pencil hardness of the specimens. As can be seen from the following table, the higher the value of H, the higher the scratch resistance, whereas the higher the value of B, the lower the scratch resistance.

TABLE 1

|  | Inventive Examples | | | | Comparative Examples | | | | | | |
| --- | --- | --- | --- | --- | --- | --- | --- | --- | --- | --- | --- |
|  | 1 | 2 | 3 | 4 | 1 | 2 | 3 | 4 | 5 | 6 | 7 |
| PC (A) | 70 | 60 | 70 | 60 | 70 | 60 | 70 | 60 | — | 80 | 95 |
| PMMA (B) | 20 | 30 | 20 | 30 | 30 | 40 | — | — | 50 | — | — |
| PETG (C) | 10 | 10 | 10 | 10 | — | — | 30 | 40 | 50 | — | — |
| PX-200 (D) | 18 | 18 | 18 | 18 | 18 | 18 | 18 | 18 | 18 | 18 | 18 |
| MBS (E) | — | — | 5 | 5 | — | — | — | — | — | 20 | 5 |
| PTEE (F) | 0.3 | 0.3 | 0.3 | 0.3 | 0.3 | 0.3 | 0.3 | 0.3 | 0.3 | 0.3 | 0.3 |
| ⅛" Izod impact (kgf · cm/cm) | 3.1 | 3.7 | 15.3 | 13.8 | 3.3 | 3.2 | 4.5 | 3.2 | 2.7 | 72.7 | 65.2 |
| Flame retardancy (UL 94, 2.5 mm thickness) | V0 | V0 | V0 | V0 | V1 | Fail | V0 | V0 | Fail | V0 | V0 |
| Pencil hardness | F | H | F | F | F | H | B | B | 2H | 2B | B |

The resin compositions of the inventive examples can maintain superior scratch resistance with a pencil hardness of F or more while exhibiting a flame retardancy of V0, which is the highest degree of flame retardancy.

In addition, by adding the MBS resin as an impact modifier to the resin composition, it is possible to obtain a resin composition having good impact strength. As compared with Inventive Example 2, although Comparative Example 2 has the same amount of polycarbonate as that of Inventive Example 2, Comparative Example 2 has a greater amount of PMMA and does not contain PET, which is an essential component of the present invention. As a result, the flame retardancy of Comparative Example 2 is reduced and fails to pass vertical burning test under UL 94 due to the aforementioned amounts. On the contrary, as can be seen from Table 1, Inventive Example 2 contains PET and thus can ensure superior pencil hardness and flame retardancy.

Comparative Example 5 does not contain the polycarbonate resin contributing to the improvement of flame retardancy and fails to attain the desired flame retardancy. In addition, as can be seen from Table 1, Comparative Examples 3, 4, 6 and 7 demonstrate poor scratch resistance when PMMA is not present.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

That which is claimed is:

1. A flame retardant thermoplastic resin composition with scratch resistance, comprising:
   a base resin comprising (A) about 30 to about 90 parts by weight of a polycarbonate resin, (B) about 15 to about 50 parts by weight of a polymethylmethacrylate resin, and (C) about 5 to about 50 parts by weight of a polyethylene terephthalate-based resin; and
   (D) about 5 to about 30 parts by weight of a phosphorus-based flame-retarding agent based on 100 parts by weight of the base resin.

2. The resin composition according to claim 1, wherein the (C) polyethylene terephthalate-based resin comprises an amorphous polyethylene terephthalate resin.

3. The resin composition according to claim 1, wherein the (D) phosphorus-based flame-retarding agent comprises an aromatic phosphoric ester-based compound represented by the following Formula:

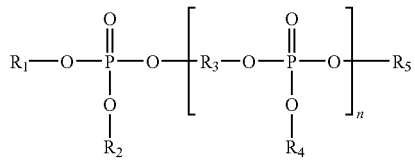

wherein $R_1$, $R_2$, $R_4$, and $R_5$ are each independently a $C_6$-$C_{20}$ aryl group or a $C_1$-$C_{20}$ alkyl-substituted $C_6$-$C_{20}$ aryl group, $R_3$ is derived from a dialcohol and the value of n ranges from 0 to 5.

4. The resin composition according to claim 1, further comprising: about 1 to about 30 parts by weight of an impact modifier based on 100 parts by weight of the base resin.

5. The resin composition according to claim 4, wherein the impact modifier is obtained by polymerizing at least one rubber monomer selected from the group consisting of diene-based rubbers, acrylate-based rubbers, silicone-based rubbers, and combinations thereof to form a rubber polymer, followed by grafting at least one monomer selected from the group consisting of graft-copolymerizable styrene, alpha-methyl styrene, alkyl-substituted styrene, acrylonitrile, methacrylonitrile, methylmethacrylate, maleic anhydride, alkyl or phenyl nucleus-substituted maleimide, and combinations thereof to the rubber polymer.

6. The resin composition according to claim 5, wherein the impact modifier is a resin obtained by graft copolymerization of methylmethacrylate and styrene to a butadiene rubber (MBS resin).

7. The resin composition according to claim 1, further comprising: at least one additive selected from the group consisting of anti-dripping agents, oxidation inhibitors, plasticizers, heat stabilizers, light stabilizers, compatibilizers, pigments, dyes, inorganic fillers, and combinations thereof.

8. A molded article formed of a flame retardant resin composition according to claim 1.

* * * * *